United States Patent [19]
Delsanto

[11] Patent Number: 5,427,228
[45] Date of Patent: Jun. 27, 1995

[54] CONVEYOR FOR SORTING GENERIC PRODUCTS TO PACKAGING OR CARTONING MACHINES

[75] Inventor: Mario Delsanto, Feletto, Italy

[73] Assignee: Hitech Systems S.r.l., Leini', Italy

[21] Appl. No.: 150,306

[22] Filed: Nov. 12, 1993

[30] Foreign Application Priority Data

Nov. 20, 1992 [IT] Italy .................. T092U0276

[51] Int. Cl.$^6$ .............................................. B65G 21/10
[52] U.S. Cl. ................................... 198/586; 198/861.2
[58] Field of Search ............... 198/586, 861.2, 861.3, 198/813, 816, 861.1, 860.1, 448, 452; 271/198, 275

[56] References Cited

U.S. PATENT DOCUMENTS

5,056,655 10/1991 Justice .......................... 198/303 X
5,295,586 3/1994 Chesnutt et al. .............. 271/300 X
5,299,674 4/1994 Cusitar .......................... 198/861,2

Primary Examiner—H. Grant Skaggs
Assistant Examiner—Carol L. Druzbick
Attorney, Agent, or Firm—Guido Modiano; Albert Josif

[57] ABSTRACT

The conveyor comprises a plurality of main conveyance units with respective conveyor belts that move in a main conveyance direction and at least one sorting unit which is interposed between two main conveyance units and is provided with an auxiliary belt and with a sorting belt. Each one of the main conveyance units comprises a frame, for supporting the respective conveyor belt, which is supported so that it is cantilevered from one side of the base structure to allow to extract and install the belt, after loosening it, at the other side of the base structure; the sorting units are provided with castors and can slide out with respect to the main units by means of a movement at right angles to the main conveyance direction.

13 Claims, 6 Drawing Sheets

CONVEYOR FOR SORTING GENERIC PRODUCTS TO PACKAGING OR CARTONING MACHINES

BACKGROUND OF THE INVENTION

The present invention relates to a conveyor for sorting generic products to packaging or cartoning machines.

More specifically, the invention relates to conveyors of the type disclosed in European Patent Application No. 91110513.8 filed on Jun. 25, 1991 in the name of the same Applicant, which comprise at least one main conveyance unit, typically two or more main conveyance units, with respective conveyor belts which move in a main conveyance direction, and at least one sorting unit provided with an auxiliary belt which moves in the main conveyance direction and with a sorting belt which moves at right angles to the main direction; the sorting unit is interposed between two main conveyance units.

In conveyors of this type, used to move food products, the main units and the sorting unit are subject to a considerable accumulation of residues left by the products conveyed, particularly residues of flour, sugar, preserves, jams and the like. These residues soil and cake not only the conveyor belts but also the guiding elements, the actuating kinematic systems and in general the entire structure of the machine, severely compromising the hygiene of the products handled and the functionality of the system.

Accordingly, it is necessary to intervene periodically to accurately clean these main and sorting units, particularly by removing the conveyor belts and cleaning them accurately or replacing them with others subjected to a prior cleaning treatment.

Currently, in known conveyors these operations are very complicated and onerous and require the intervention of skilled personnel that disassembles and reassembles the conveyance units. These disassembly, cleaning and reassembly operations usually use up an entire work shift. Considering that the frequency of the required cleaning intervention is approximately one intervention every 8-10 work shifts, the time wasted for this task is comprised between 12 and 10% of the actual production time.

These considerable downtimes, together with the costs of the skilled personnel currently involved in these disassembly, cleaning and reassembly operations, make it very onerous to manage these conveyance systems, with a consequent loss in the economic yield of the system.

SUMMARY OF THE INVENTION

The aim of the present invention is to eliminate these severe drawbacks with improvements to the main and sorting units of the conveyor which allow to drastically reduce the time required for their cleaning and/or ordinary maintenance and to avoid the intervention of skilled personnel (maintenance team) for the disassembly and reassembly of the machines.

Within the scope of this general aim, the invention improves the main and sorting units of the conveyor, allowing to remove and reposition the conveyor belts and the rollers for the movement of said belts in a very short time, without the aid of any tool and with very simple operations which can be performed easily by the same personnel that monitors the operation of the system.

Another important and particular object of the invention is to improve conventional conveyors of the specified type, facilitating access to the sorting units, each placed between two main units. In particular, another improvement according to the present invention has the purpose of allowing rapid and easy removal of the sorting unit or units, which can be replaced in a very short time with other units on which cleaning or maintenance operations have already been performed.

According to the present invention, this aim, these objects and others which will become apparent from the following detailed description are achieved by virtue of the fact that each one of said main conveyance units of the conveyor has a frame for supporting the respective conveyor belt which is supported so that it is cantilevered from one side of the base structure, or table, to allow to fit and remove said belt at the other side of the table, which has no supports interfering with said belt.

Another characteristic of the conveyor according to the invention is the fact that each one of the sorting units comprises a base structure which is supported by respective posts provided with castors, and that said base structure is provided with retention guides accommodated in sliding seats supported by the adjacent main units, with respect to which said sorting units can be extracted by means of a movement at right angles to the main conveyance direction, allowed by said castors.

BRIEF DESCRIPTION OF THE DRAWINGS

The invention will become apparent from the following detailed description and with reference to the accompanying exemplifying drawings, wherein.

DESCRIPTION OF THE PREFERRED EMBODIMENTS

Figure 1:
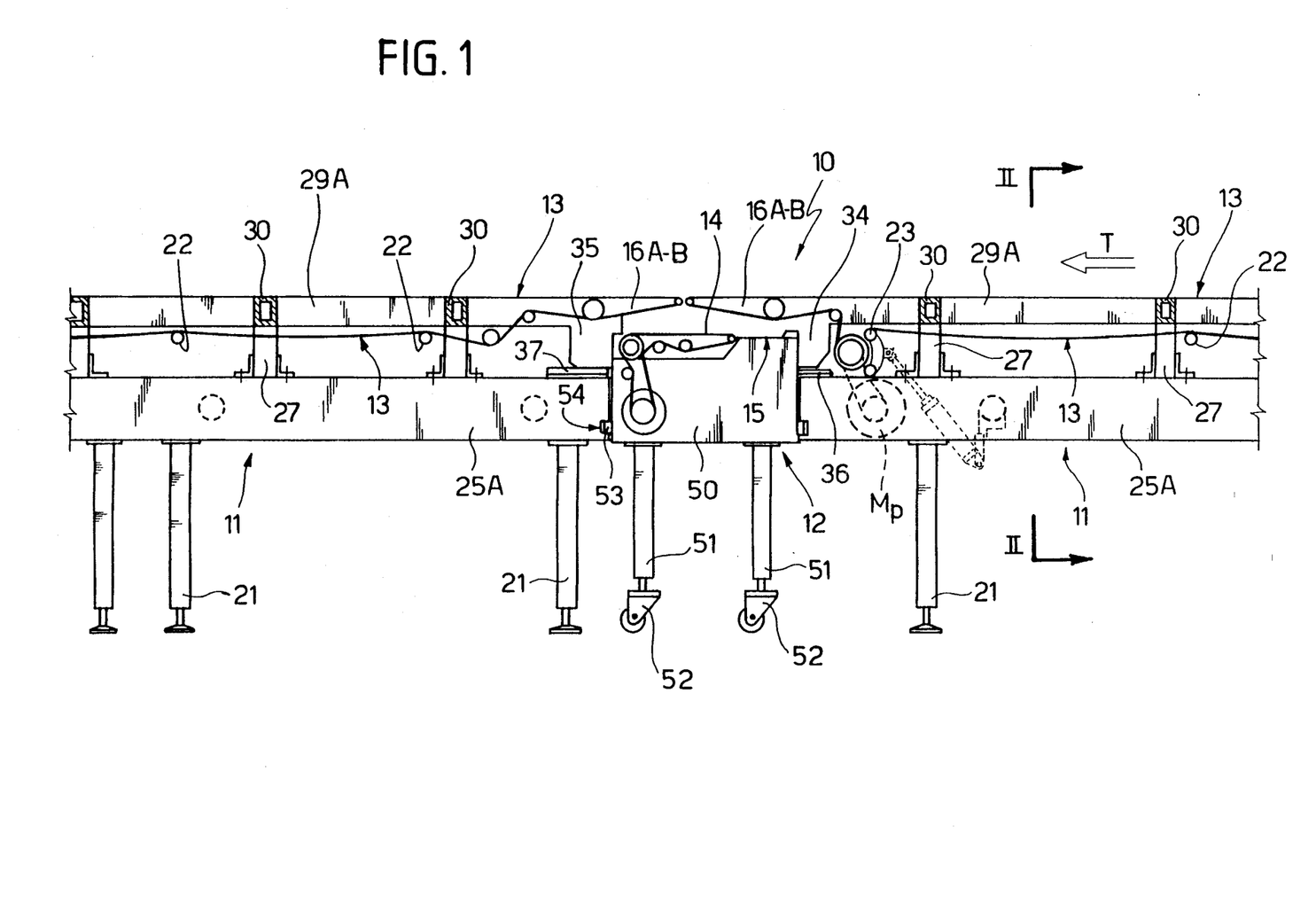
FIG. 1 is a longitudinal and partial schematic sectional view of the conveyor according to the invention, illustrating a pair of main conveyance units and a sorting unit interposed between them.

In FIG. 1, the reference numeral 10 generally designates the conveyor, which comprises two or more main conveyance units 11 and at least one sorting unit 12 interposed between them. The main conveyance units 11 have respective conveyor belts 13 which define a main conveyance direction T for generic rows of products, such as food products and the like, and the sorting unit 12 is provided with an auxiliary belt 14 which moves in the main conveyance direction and with a sorting belt 15 which moves at right angles to the main direction, defining a corresponding direction for the sorting of said products which is at right angles to said main direction T. Each one of the main conveyance units 11, which are arranged so that they face each other and are mutually adjacent, comprises a pair of sorting arms $16_A$–$16_B$ provided with guiding rollers for the respective conveyor belt 13, and the auxiliary belt 14 and the sorting belt 15 of the sorting unit 12 are arranged at a lower level with respect to the main conveyance plane defined by the belts 13. The arms 16 of the main units 11 are mutually adjacent, and each one can assume, when moved by corresponding actuators (not shown), a raised conveyance position, which is co-planar with respect to the main conveyance plane, and a lowered sorting position, in which they arrange themselves tangent to the auxiliary belt 14 of the sorting unit 12.

Figure 2:
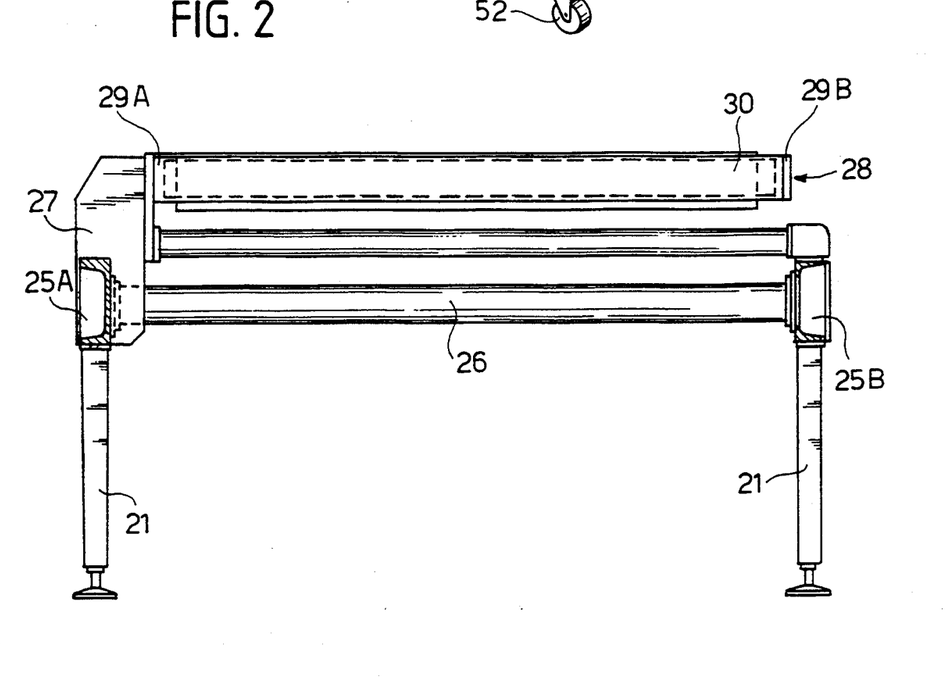
FIG. 2 is a schematic transverse sectional view of a main conveyance unit, taken along the plane II—II of FIG. 1.

Each main conveyance unit 11 has its own motor $M_P$ for moving the belt 13 and is constituted by a table-like supporting structure provided with posts 21 for resting on the ground. The supporting structure is provided with a plurality of rollers 22 for the resting and sliding of the lower portion of the belt 13, with at least one tension roller 23 and with a series of removable plates 24 which form a supporting surface for the upper portion of said belt.

Figure 4:
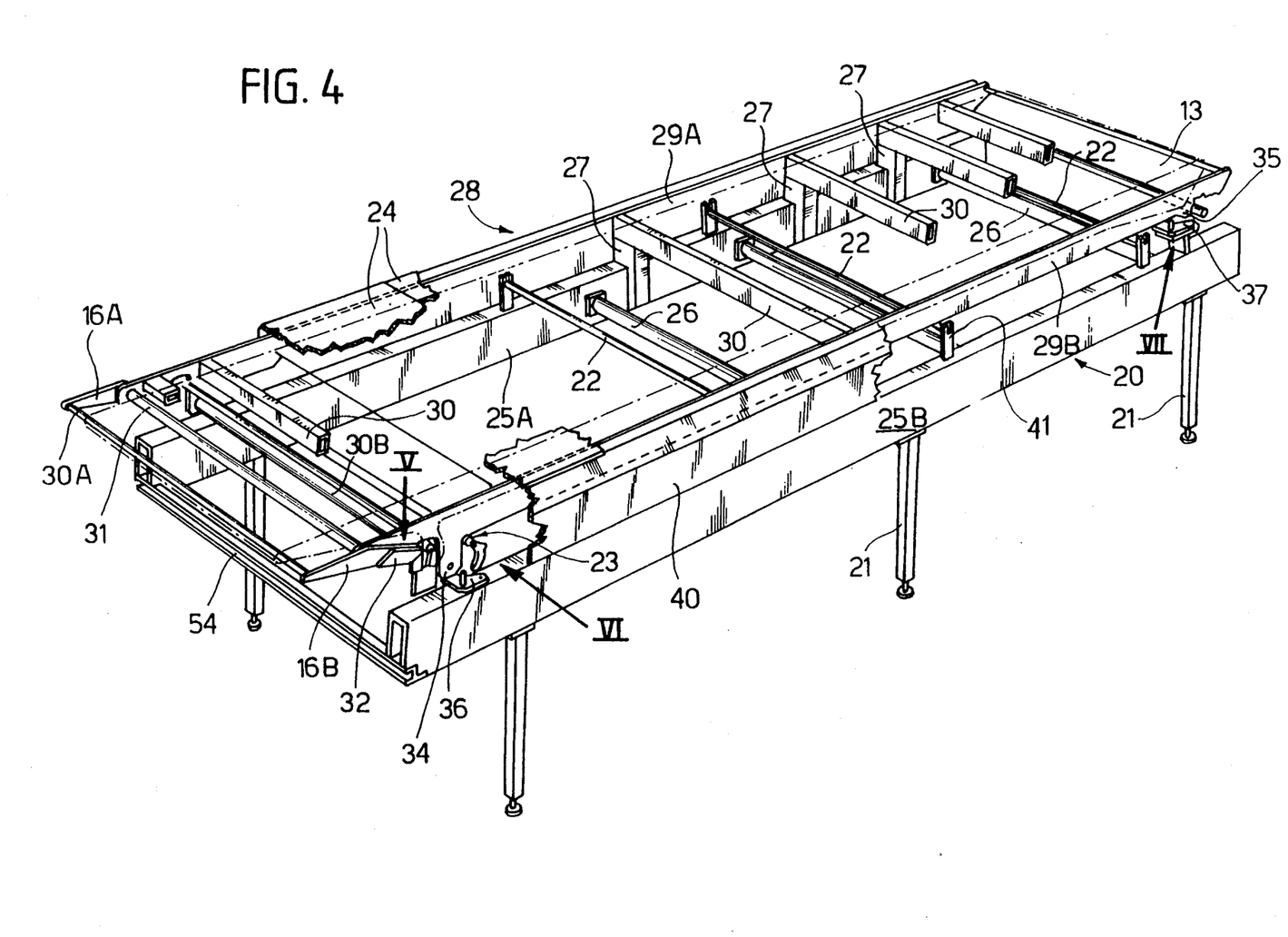
FIG. 4 is a detailed perspective view of a main conveyance unit.

According to the present invention, the table-like structure is cantilevered to allow, in accordance with the stated aim and objects, easy lateral extraction of the belt 13 after slackening the tension roller 23. For this purpose, the structure comprises a first strong base frame 20 which is supported by the posts 21 and is formed by two box-type longitudinal beams $25_A$–$25_B$ connected by cross-members 26. The base frame 20 supports, at the beam $25_A$, a series of upright-like supports 27 which are rigidly jointed to said beam by means of fixing plates. In turn, the supports 27 support in a cantilevered manner a second frame 28 constituted by side members $29_A$–$29_B$ connected by cross-members 30. The pair of sorting arms 16 is articulated to one end of the side members 29 by means of a supporting and articulation pivot 31.

Figures 3, 5:
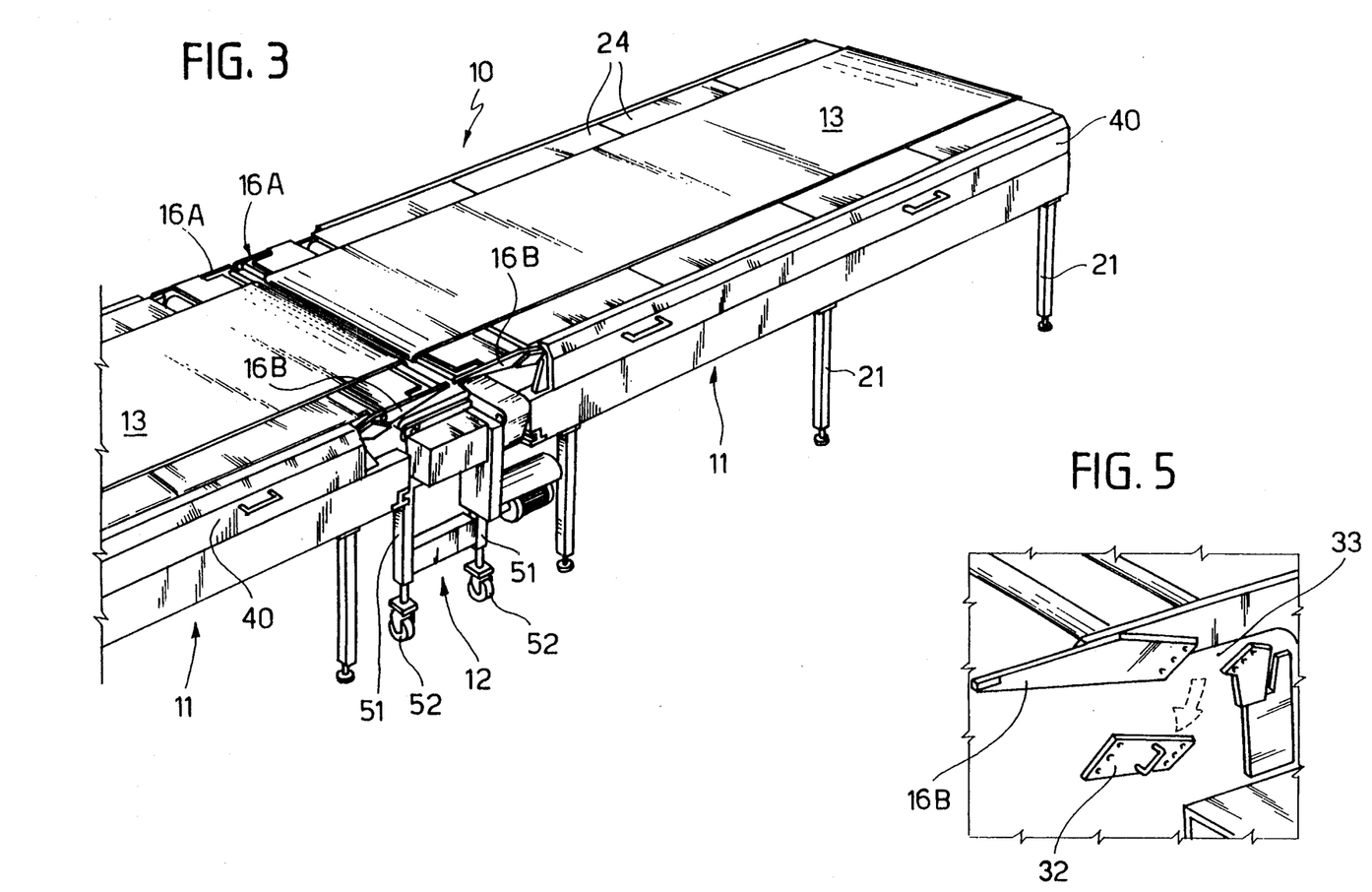
FIG. 3 is a partial perspective view of the conveyor of FIG. 1.
FIGS. 5 to 7 are enlarged-scale views of details of FIG. 4.

The arms 16 bear a first roller $30_A$ for guiding the upper portion of the belt 13 and a second roller $30_B$ for supporting the lower portion of said belt. The second roller $30_B$ is supported at the ends of extensions of the arms 16 which are directed toward the side members 29 of the frame 28. On the arm $16_B$ arranged at the side member $29_B$ on the cantilevered side of the frame 28, the extension which forms the support for the roller $30_B$ is connected to said arm by means of a removable plate 32, and a gap 33 (FIG. 5) is formed between the arm and the extension, allowing the lateral extraction of the belt 13, as better described hereinafter.

Figure 6:
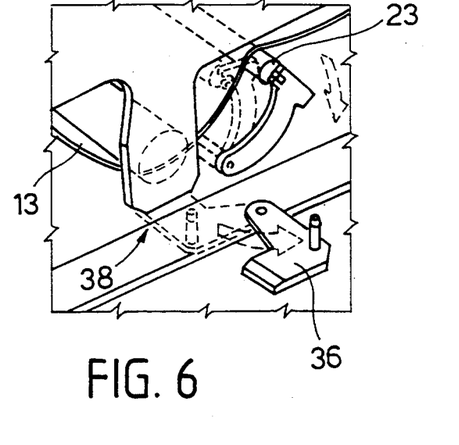
Figure 7:
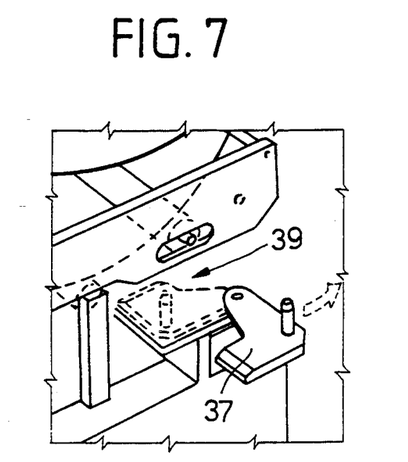

The side member $29_B$ on the cantilevered side of the frame 28 is provided with front and rear supports 34–35 suitable to engage corresponding supporting plates 36–37 that ensure the stability of the frame 28 during the operation of the conveyor. The supporting plates 36 and 37 are pivoted to the corresponding beam $25_B$ of the base frame and can assume an active position, shown in dashed lines in FIGS. 6 and 7, and an open position, shown in solid lines in said figures. In the active position, the plates 36–37 engage the corresponding supports 34–35 of the side member $29_B$; in the open position, the plates move away from the supports, and corresponding gaps 38–39 (FIGS. 6–7), suitable to allow said lateral extraction of the belt, are formed between said supports and the beam $25_B$.

Barriers 40 are interposed between the base frame 20 and the cantilevered frame 28 and are constituted by light removable housings which laterally close the structure of the conveyor; these barriers are provided with known snap-action retention and engagement means, not shown in the figure.

The described structure allows, in accordance with the stated purposes, to easily disassemble the main unit for cleaning and/or maintenance and particularly to easily remove the belt 13 which is removed from the frame 28 at the cantilevered side thereof.

Figure 8:
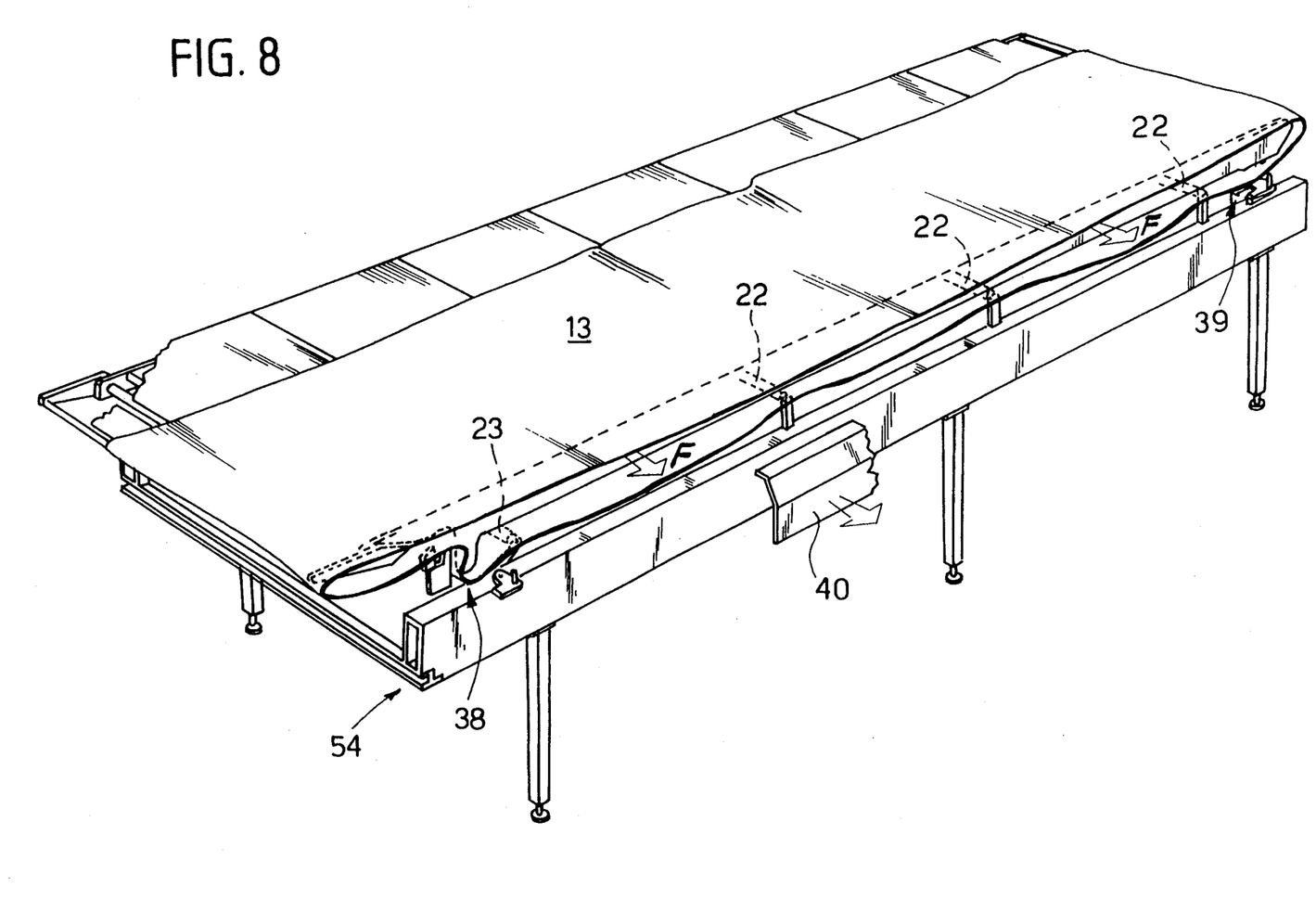
FIG. 8 is a perspective view, similar to FIG. 4, illustrating the method for removing the belt of a main conveyance unit.

For this purpose, the barriers 40 are removed first; then the plates 36–37 are rotated into the open position and the plate 32 of the arm $16_B$ is removed. The tension roller 23 is furthermore slackened to loosen the belt 13, and then said belt is removed laterally in the direction of the arrows F, as clearly shown in FIG. 8. Naturally, belt reinstallation proceeds in reverse to what has been described above.

Removal of the belt exposes the plates 24 and the guiding rollers 22. Said rollers are provided with end pivots which are accommodated in forks of respective supporting uprights 41 and can thus be easily removed, after removing the plates 24, by pulling upward.

Figure 9:
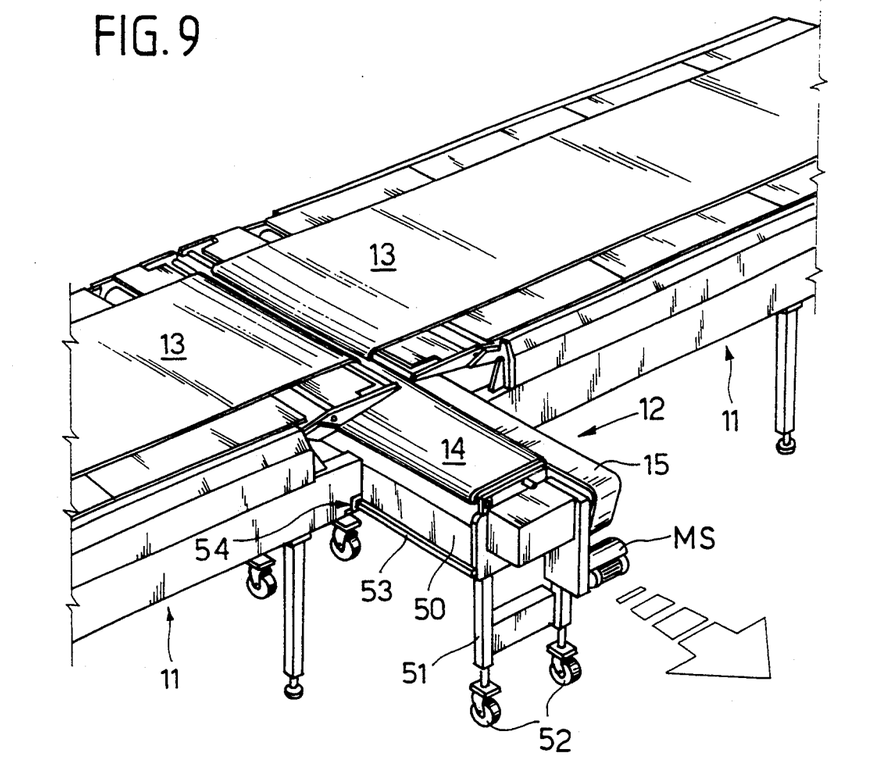
FIG. 9 is a perspective view, similar to FIG. 3, illustrating the method for removing a sorting unit.
Figure 10:
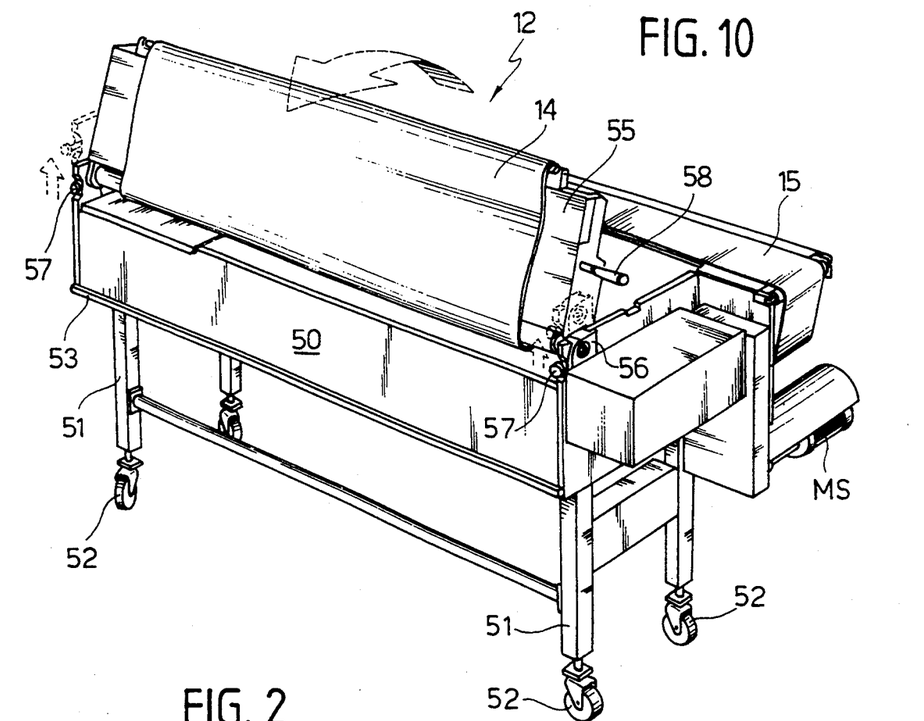
FIG. 10 is a detailed perspective view of a sorting unit.

As clearly shown in FIGS. 1, 9 and 10, the sorting unit 12 is in turn provided with a base structure 50 which supports the motor $M_S$ for moving the belt 15 and is supported by supporting posts 51 which end with respective castors 52. Said base structure 50 is also provided with guides 53 accommodated in corresponding sliding seats 54 provided on the front side and respectively on the end side of the main conveyance units 11 between which said sorting unit 12 is interposed.

With this arrangement, and by virtue of the presence of the castors 52, each sorting unit 12 can be removed by sliding it out at right angles to the main conveyance direction T, as clearly shown in FIG. 9, and can be rapidly replaced with a similar sorting unit previously subjected to cleaning and/or maintenance operations.

FIG. 10 shows that these operations for cleaning the sorting unit 12 are in turn significantly facilitated by virtue of the fact that the auxiliary belt 14 of said unit is supported by an oscillating frame 55 which is pivoted to the base structure 50 by means of removable supports 56 which are rigidly coupled to said structure by means of threaded pins provided with a knob 57. By loosening these pins it is possible to easily remove the frame 55 after moving it into the tilted position of FIG. 10 by means of handles 58.

It is possible to remove the belt 14 from the frame 55 and to fit said belt onto said frame by respectively pulling it off and fitting it on parallel to the longitudinal direction of said frame; the belt is loose by virtue of the fact that its lower portion, upon the rotation of the frame 55, no longer makes contact with one or more tension rollers, not shown, which are supported by the base structure 50.

Naturally, the effects of the present invention also cover models which achieve equal utility by using the same innovative concept.

What is claimed is:

1. Conveyor for sorting generic products to packaging and cartoning machines, comprising:
   a plurality of main conveyance units having respective conveyor belts, said conveyor belts being moveable along a main conveyance direction;

at least one sorting unit which is interposed between two main conveyance units, said sorting unit being provided with an auxiliary belt and with a sorting belt;

wherein each one of said main conveyance units comprises:

a base structure, said base structure including longitudinal side beams extending along said main conveyance direction; and a frame for supporting a respective one of said conveyor belts, said supporting frame comprising two side members extending along said main conveyance direction, said side members being interconnected by cross-members, one of said side members being connected to a first one of said longitudinal side beams of said base structure, whereby said supporting frame being supported in a cantilevered manner on said first side beam of said base structure, and a second one of said side members is provided with front and rear supports, said supports being adapted to engage corresponding supporting plates, said supporting plates being connected to a second one of said longitudinal side beams of said base structure, and said supporting plates being further movable between an active position in which they engage said front and rear supports for ensuring stability of said cantilevered frame during operation of the conveyor and an open position in which said supporting plates are moved away from said supports to allow both extraction and resetting of said conveyor belts from and on said cantilevered supporting frame.

2. Conveyor according to claim 1, wherein said sorting unit comprises a base structure which is supported by posts, said posts being provided with castors, and said base structure being provided with retention guides which are accommodatable in sliding seats, said sliding seats being supported by adjacent ones of said main conveyance units; said sorting unit being further removable from said adjacent main conveyance units by means of a sliding movement at right angles to the main conveyance direction, allowed by said castors.

3. Conveyor according to claim 2, wherein said auxiliary belt is movable in the main conveyance direction, and said sorting belt is movable at a right angle to said main conveyance direction, said sorting unit further comprising a motor for moving said sorting belt, said motor being supported on said base structure of said sorting unit.

4. Conveyor according to claim 3, wherein each one of said sorting units is provided with an oscillating frame for supporting said auxiliary belt and wherein said frame is pivoted to the base structure by means of removable supports, said supports being removable for allowing to separate said oscillating frame from said base structure, and respectively to remove and further to reinstall said auxiliary belt from and on said oscillating frame.

5. Conveyor according to claims 1 or 3, wherein each of said main conveyance units further comprises: a pair of sorting arms; a first roller for guiding an upper portion of said conveyor belt movable along said main conveyance direction; and a second roller for supporting a lower portion of said conveyor belt; said sorting arms being pivoted to an end of said first and second side members of said supporting frame, each of said sorting arms further comprising a first and a second extension, said first and second extensions bearing respectively said first and said second rollers, and wherein a second extension of said sorting arm pivoted to said end of said second side member is connected to said arm by means of a removable plate, a gap closed by said plate and adapted to allow lateral extraction of said conveyor belt being delimited between said arm and its said second extension.

6. Conveyor according to claim 5, wherein said sorting arms are movable between a raised conveyance position for defining a main conveyance plane extending along said main conveyance direction, and a lowered sorting position in which said arms are tangent to said auxiliary belt.

7. Conveyor according to claim 5, wherein said base structure comprises a plurality of rollers for slidingly supporting said lower portion of said conveyor belt and at least one belt tension roller, said belt tension roller being controlled by a fluid-activated actuator.

8. Conveyor according to claim 7, wherein said support rollers are provided with end pivots which are accommodated in respective fork-like supports so that said rollers can be removed by extracting the pivots from the respective forks.

9. Conveyor according to claim 5, wherein said belt supporting frame is provided with removable plates which form a supporting surface for the upper portion of said belt.

10. Conveyor according to claim 1, wherein said one of said side members of said supporting frame is supported by uprights rigidly connected to said first side beam of said base structure.

11. Conveyor according to claim 1, wherein said supporting plates are pivoted to said second side beam of said base structure and are rotatingly movable from said active position, to said open position for providing corresponding gaps adapted to allow lateral extraction of said conveyor belt, said gaps being formed between said supports and said second side beam of said base structure.

12. In a conveyor for sorting generic products to packaging and cartoning machines, said conveyor including a plurality of main conveyance units having respective conveyor belts, said conveyor belts being moveable along a main conveyance direction, each one of said main conveyance units comprising:

a base structure, said base structure including longitudinal side beams extending along said main conveyance direction;

a frame for supporting a respective one of said conveyor belts, said supporting frame comprising two side members extending along said main conveyance direction, said side members being interconnected by cross-members, one of said side members being connected to a first one of said longitudinal side beams of said base structure, whereby said supporting frame being supported in a cantilevered manner on said first one of said longitudinal side beams of said base structure; and a pair of sorting arms, said sorting arms being pivoted to an end of said first and second side members of said supporting frame, said sorting arms being movable between a raised conveyance position for defining a main conveyance plane extending along said main conveyance direction, and a lowered sorting position in which said arms are tangent to said auxiliary belt;

a sorting unit comprising: a base structure; an auxiliary belt being movable in the main conveyance direction; a sorting belt being movable at a right angle to said main conveyance direction, said auxiliary belt and said sorting belt being supported on said base structure, said base structure being supported by posts, said posts being provided with castors, and said base structure being provided with retention guides which are accommodatable in sliding seats, said sliding seats being supported by adjacent ones of said main conveyance units, thereby said sorting unit being removable from said adjacent main conveyance units by means of a sliding movement at right angles to the main conveyance direction, allowed by said castors.

13. In a conveyor for sorting generic products to packaging and cartoning machines, the sorting unit according to claim 12, wherein said sorting unit is provided with an oscillating frame for supporting said auxiliary belt and wherein said frame is pivoted to the base structure by means of removable supports, said removable supports allowing upon loosening thereof to separate said frame from said base structure, and to respectively remove and further reinstall said auxiliary belt from and on said frame according to a direction perpendicular to said main conveyance direction.

* * * * *